United States Patent
Clemons

[11] Patent Number: 6,016,597
[45] Date of Patent: Jan. 25, 2000

[54] APPARATUS AND METHOD FOR RETAINING BEARING CUPS ON A UNIVERSAL JOINT DURING LUBRICATION

[75] Inventor: Ted D. Clemons, Hilliard, Ohio

[73] Assignee: Dana Corporation, Toledo, Ohio

[21] Appl. No.: 09/001,856

[22] Filed: Dec. 31, 1997

[51] Int. Cl.[7] .................................. B23Q 3/00; B23B 5/12
[52] U.S. Cl. .................................. 29/559; 29/254; 29/283; 29/898.1; 269/254
[58] Field of Search .................................. 29/254, 281.1, 29/283, 559, 898.1; 269/47, 52, 254 R; 184/105.1; 403/289, 290

[56] References Cited

U.S. PATENT DOCUMENTS

| 1,627,477 | 5/1927 | Blume et al. | 29/254 |
|---|---|---|---|
| 1,893,414 | 3/1933 | Johnson et al. | 29/254 |
| 2,519,204 | 8/1950 | Sturm | 29/254 |
| 2,779,089 | 1/1957 | Allen | 29/254 |
| 3,280,455 | 10/1966 | Smith | 29/254 |
| 3,529,497 | 9/1970 | Brooks . | |
| 3,739,452 | 6/1973 | Gadberry . | |
| 4,665,602 | 5/1987 | Woodward et al. | 29/254 |
| 4,745,671 | 5/1988 | Shannon | 29/254 |
| 5,000,609 | 3/1991 | Dutkiewicz et al. . | |
| 5,042,591 | 8/1991 | Hull | 173/91 |
| 5,379,986 | 1/1995 | Perez et al. | 29/254 |

Primary Examiner—David P. Bryant
Assistant Examiner—Essama Omgba
Attorney, Agent, or Firm—MacMillan Sobanski & Todd, LLC

[57] ABSTRACT

An apparatus and method for retaining the bearing cups on the trunnions of a universal joint cross when supplying lubricant therein includes a body portion having a pair of end portions extending therefrom. An insert is preferably removably secured to each of the end portions by any conventional means, such as by threaded fasteners. A shank portion extends from the body portion in a direction that is opposite from the end portions. The shank portion is preferably formed having a non-circular shape, such as square. The bearing cup retaining apparatus further includes a hollow hammer portion that is disposed about the shank portion. The inner surface of the hammer portion preferably corresponds in shape to the non-circular outer surface of the shank portion so as to be axially slidable along the shank portion without being rotatable relative thereto. To install the bearing cup retaining apparatus, the hammer portion is rapidly moved into abutment with the body portion. When this is done, the hammer portion exerts a force urging the bearing cup retaining apparatus axially toward the universal joint and yoke assembly. As a result, the end portions of the bearing cup retaining apparatus flex slightly apart from one another, allowing the inserts to be moved over the end surfaces of the bearing cups. In this manner, the bearing cup retaining apparatus is firmly installed so as to positively retain the bearing cups on the trunnions of the universal joint cross during a subsequently lubricant purging process.

12 Claims, 4 Drawing Sheets

APPARATUS AND METHOD FOR RETAINING BEARING CUPS ON A UNIVERSAL JOINT DURING LUBRICATION

BACKGROUND OF THE INVENTION

This invention relates in general to universal joints and in particular to an improved apparatus and method for retaining the bearing cups on the trunnions of a universal joint cross when supplying lubricant therein.

Universal joints are well known devices which provide a driving connection between two members adapted to rotate about non-aligned axes of rotation. Universal joints are widely used to connect rotatable members in vehicle drive train systems. In a typical drive train system, a first universal joint is connected between an output shaft of an engine/transmission assembly and a first end of a driveshaft tube, while a second universal joint is connected between a second end of the driveshaft tube and an input shaft of an axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A typical structure for a universal joint includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement therebetween. The bearing cups mounted on a first opposed pair of the trunnions are connected to a first yoke which, in turn, is secured to one of the rotatable components of the vehicle drive train system. Similarly, the bearing cups mounted on a second opposed pair of the trunnions are connected to a second yoke which, in turn, is secured to a second one of the rotatable components of the vehicle drive train system.

Frequently, the first and second universal joints are manufactured concurrently with the driveshaft tube at a first location, then shipped as a unit to a second location for assembly with the other components of the vehicle drive train system. In such a manufacturing process, yokes are initially secured to the ends of the driveshaft tube, then a universal joint is connected to each of the yokes. Thus, for each of the universal joints, only one opposed pair of the bearing cups is connected to a yoke and, therefore, positively retained on the respective trunnions. The other opposed pair of the bearing cups remains mounted on the respective trunnions, but is not positively retained thereon. Following installation on the yokes, each of the universal joints is purged with lubricant. Such purging is well known in the art and involves the injection lubricant within the cross at a relatively high pressure. The lubricant passes through bores formed through each of the trunnions so as to move into the regions of the bearings disposed between the bearing cups and the trunnions.

Because of the high pressure conditions generated during the lubricant purging process, the bearing cups are urged to move radially outwardly from the ends of the respective trunnions. As mentioned above, the lubricant purging process typically occurs after the universal joints have been secured to the ends of the driveshaft tube. Thus, as mentioned above, only one opposed pair of the bearing cups is positively retained on the trunnions of each of the universal joints during the purging process. The other opposed pair of the bearing cups must be positively retained on the trunnions of each of the universal joints by other means during the purging process. A number of structures are known in the art for retaining these bearing cups on the trunnions. However, it has been found that known retaining structures are difficult to install and remove in an efficient manner. Thus, it would be desirable to provide an improved apparatus and method for retaining the bearing cups on the trunnions of a universal joint cross when supplying lubricant therein.

SUMMARY OF THE INVENTION

This invention relates to an improved apparatus and method for retaining the bearing cups on the trunnions of a universal joint cross when supplying lubricant therein. The bearing cup retaining apparatus includes a body portion having a pair of end portions extending therefrom. An insert is preferably removably secured to each of the end portions by any conventional means, such as by threaded fasteners. A shank portion extends from the body portion in a direction that is opposite from the end portions. The shank portion is preferably formed having a non-circular shape, such as square. The bearing cup retaining apparatus further includes a hollow hammer portion that is disposed about the shank portion. The inner surface of the hammer portion preferably corresponds in shape to the non-circular outer surface of the shank portion so as to be axially slidable along the shank portion without being rotatable relative thereto. To install the bearing cup retaining apparatus, the hammer portion is rapidly moved into abutment with the body portion. When this is done, the hammer portion exerts a force urging the bearing cup retaining apparatus axially toward the universal joint and yoke assembly. As a result, the end portions of the bearing cup retaining apparatus flex slightly apart from one another, allowing the inserts to be moved over the end surfaces of the bearing cups. In this manner, the bearing cup retaining apparatus is firmly installed so as to positively retain the bearing cups on the trunnions of the universal joint cross during a subsequently lubricant purging process.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
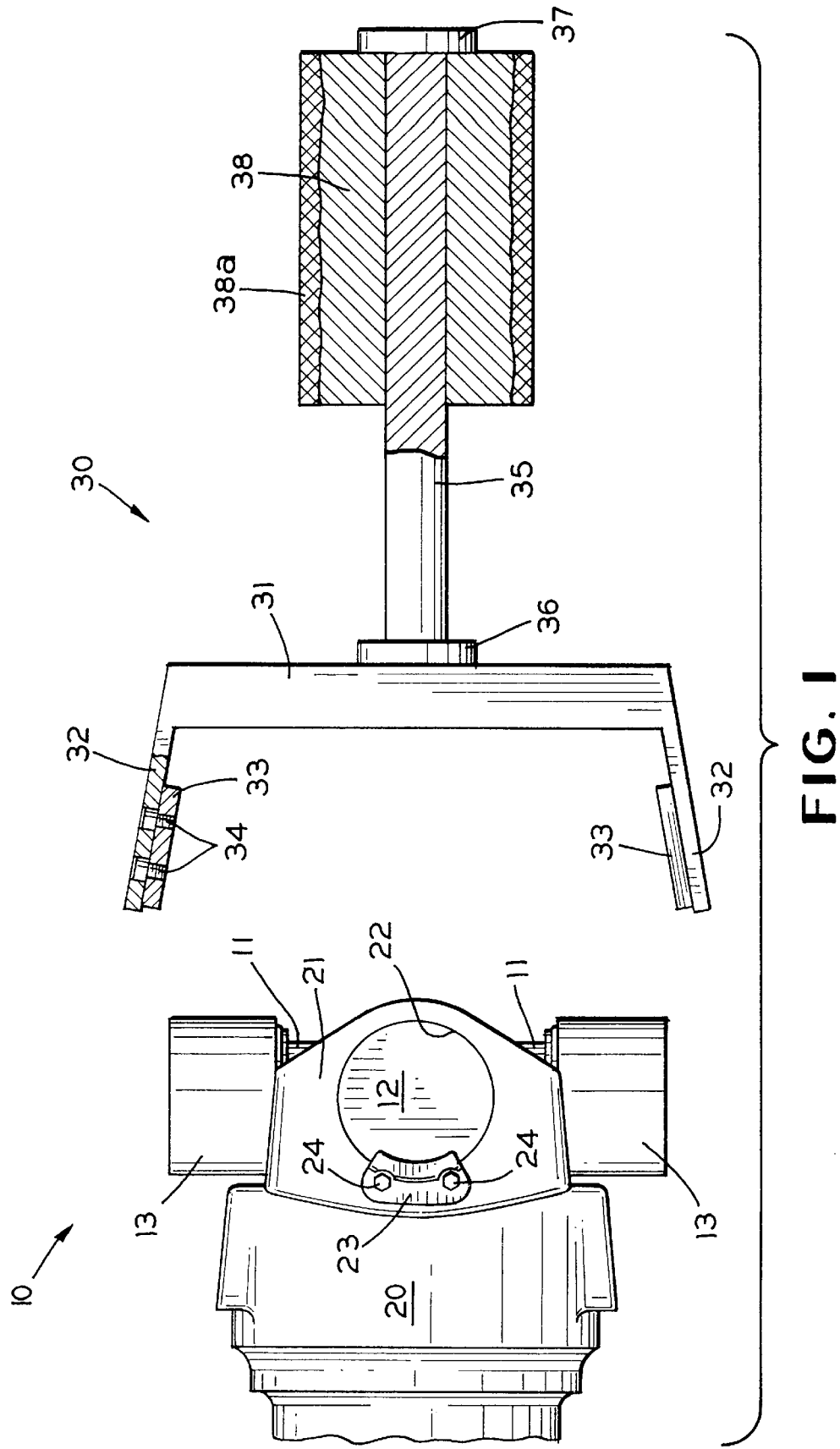
FIG. 1 is an exploded elevational view, partially in cross section, of a universal joint and a first embodiment of an apparatus for retaining the bearing cups on the trunnions of the universal joint cross when supplying lubricant therein in accordance with this invention.

Referring now to the drawings, there is illustrated in FIG. 1 a universal joint and yoke assembly, indicated generally at 10, that is conventional in the art. Although this invention will be described and illustrated in the context of the illustrated universal joint and yoke assembly 10, it will be appreciated that this invention may be practiced with any type of universal joint. The illustrated universal joint and yoke assembly 10 includes a universal joint cross member having a central body portion (not shown) and four generally cylindrical trunnions 11 (only two are shown). The trunnions 11 extend radially outwardly from the central body portion in a common plane at right angles relative to one another. Hollow cylindrical bearing cups 12 and 13 are mounted on the end of each of the trunnions 11. A plurality of needle bearings (not shown) or similar means are provided between the outer cylindrical surfaces of the trunnions 11 and the inner cylindrical surfaces of the bearing cups 12 to permit relative rotational movement therebetween.

The bearing cups 12 (only one is illustrated) mounted on a first opposed pair of the trunnions 11 are connected to a yoke 20 which is adapted to be secured to a rotatable component, such as a driveshaft tube of a vehicle drive train system. The illustrated yoke 20 is a full round end yoke including a generally cylindrical body having a pair of opposed arms 21 (only one is illustrated) extending therefrom. Each of the opposed arms 21 has a cylindrical opening 22 formed therein, and the bearing cups 12 are received in the cylindrical openings 22. A pair of retainer straps 23 (only one is illustrated) is provided for retaining the opposed bearing cups 12 within the cylindrical openings 22 of the yoke 20. Each of the retainer straps 23 is formed from a generally flat, relatively thin metallic strip having a pair of non-threaded openings (not shown) formed therethrough. Threaded fasteners 24 extend through the non-threaded apertures into engagement with threaded apertures (not shown) formed in the arms 21 of the yoke 20 to secure the retainer straps 23 thereto. Portions of the retainer straps 23 extend over the end surfaces of the opposed bearing cups 12. As a result, the opposed bearing cups 12 are positively retained within the cylindrical openings 22 of the end yoke 20.

The illustrated universal joint and yoke assembly 10 is ready to be purged with lubricant. As discussed above, such purging involves the injection of lubricant within the cross at a relatively high pressure. The lubricant passes through bores (not shown) formed through each of the trunnions 11 so as to move into the regions of the needle bearings disposed between the trunnions 11 and the bearing cups 12 and 13. Because of the retainer straps 23, the bearing cups 12 mounted on the first opposed pair of the trunnions 11 are restrained from moving radially outwardly apart from one another during the lubricant purging process. However, the bearing cups 13 mounted on the second opposed pair of the trunnions 11 are not positively retained on the trunnions 11 of the universal joints during the lubricant purging process.

A first embodiment of a bearing cup retaining apparatus, indicated generally at 30, is provided to temporarily retain the bearing cups 13 on the trunnions 11 during the lubricant purging process. The bearing cup retaining apparatus 30 includes a body portion 31 having a pair of end portions 32 extending therefrom. The end portions 32 may extend parallel to one another, but it has been found to be preferable if the end portions 32 extend slightly apart from one another, such as at an angle of approximately two degrees each relative to a center line extending therebetween. An insert 33 is preferably removably secured to each of the end portions 32 of the bearing cup retaining apparatus 30 by any conventional means, such as by threaded fasteners 34 as illustrated.

The bearing cup retaining apparatus 30 also includes a shank portion 35 that extends from the body portion 31 in a direction that is opposite from the end portions 32. The shank portion 35 is formed having a non-circular shape, such as the illustrated square cross sectional shape, for a purpose that will be explained below. First and second washers 36 and 37 are secured to the ends of the shank portion 35. The first washer 36 is disposed adjacent to the body portion 31 of the bearing cup retaining apparatus 30, while the second washer 37 is located at the opposite end of the shank portion 35. The first and second washers 36 and 37 are preferably formed having an outer dimension that is slightly larger that the outer dimension of the shank portion 31, for a purpose that will be described below.

The bearing cup retaining apparatus 30 further includes a hollow hammer portion 38 that is disposed about the shank portion 35 between the first and second washers 36 and 37. The inner surface of the hammer portion 38 preferably corresponds in shape to the non-circular outer surface of the shank portion 35, but is slightly larger in dimension. Thus, the hammer portion 38 can slide axially along the shank portion 35 between the first and second washers 36 and 37 without being rotatable relative thereto. The outer surface of the hammer portion 38 is preferably cylindrical in shape and defines an outer dimension that is somewhat larger than the outer dimensions of the first and second washers 36 and 37, for a purpose that will be explained below. The outer surface of the hammer portion 38 is preferably knurled, as shown at 38a, or otherwise formed having a non-slip surface, again for a purpose that will be explained below. All of the various portions of the bearing cup retaining apparatus 30 are preferably formed from a high strength, rigid material, such as steel, and may be secured together in any conventional manner, such as by welding.

Figure 2:
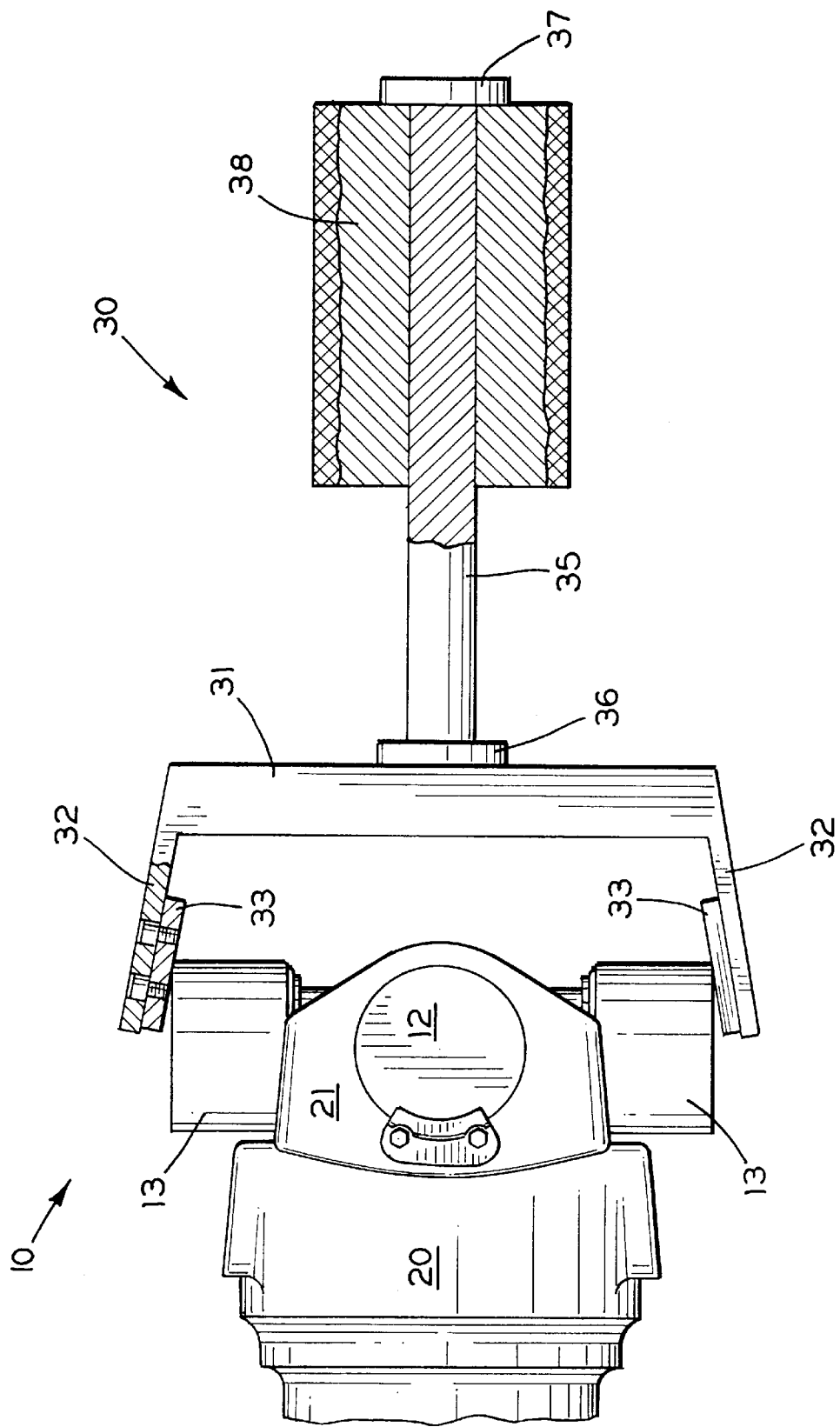
FIG. 2 is an elevational view similar to FIG. 1 showing the bearing retaining apparatus partially installed on the universal joint prior to supplying lubricant therein.

The operation of the bearing cup retaining apparatus 30 will now be described with reference to FIGS. 2 and 3. An operator initially grasps the hammer portion of the bearing cup retaining apparatus 30 and positions it as shown in FIG. 2 such that the inserts 33 mounted on the end portions 32 lightly abut the outer surfaces of the opposed bearing cups 13 as shown in FIG. 2. As previously discussed, the end portions 32 preferably extend at a slight angle relative to one another to facilitate this orientation. Thus, the outermost ends of the inserts 33 are preferably spaced apart from one another by a distance that is slightly larger than the distance separating the end surfaces of the opposed bearing cups 13, while the innermost ends of the inserts 33 are preferably spaced apart from one another by a distance that is slightly smaller than such distance. Accordingly, interior portions of the inserts 33 abut the outer surfaces of the bearing cups 13. In this initial position, the bearing cup retaining apparatus 30 only lightly retains the opposed bearing cups 13 on the respective trunnions 11.

Figure 3:
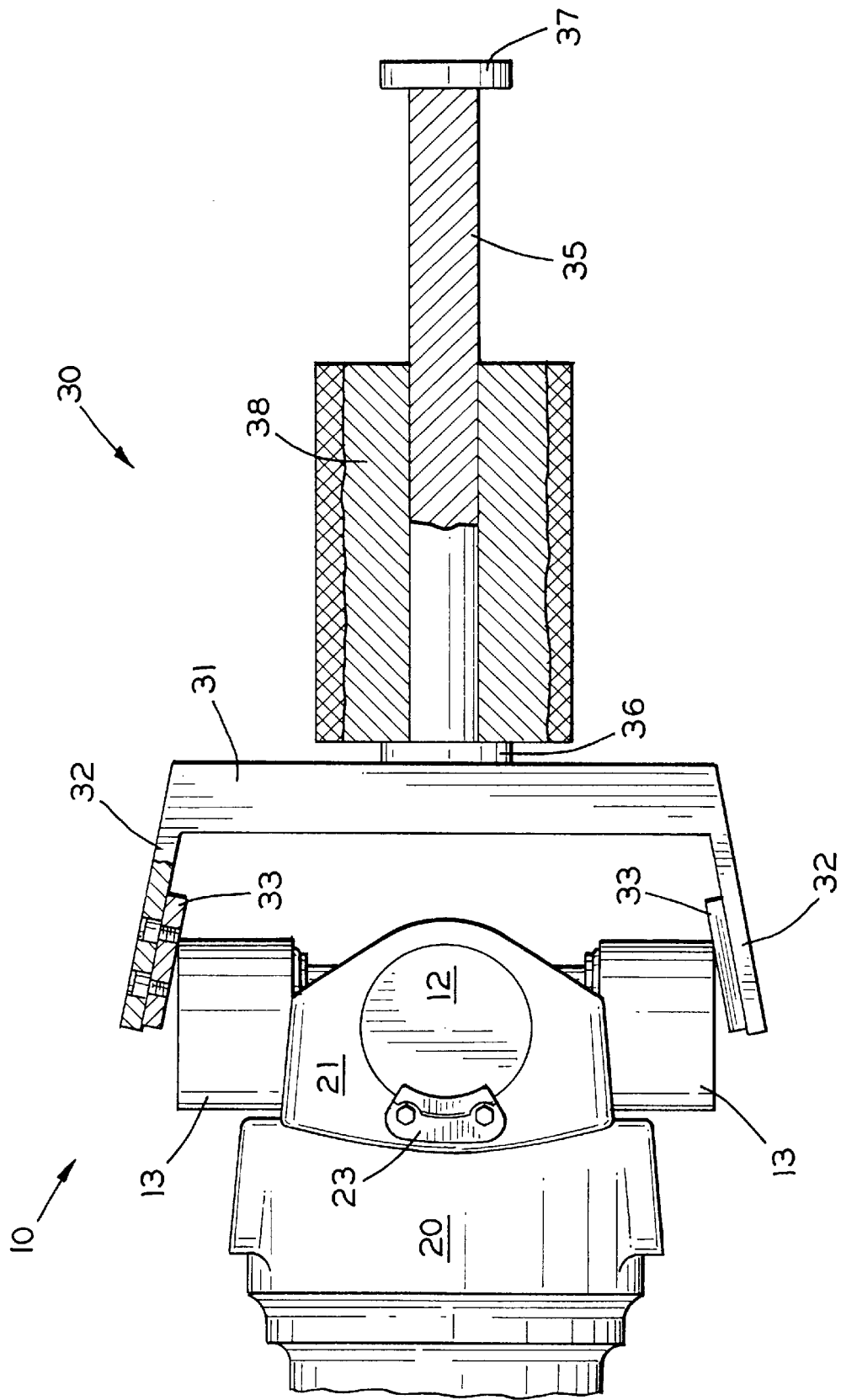
FIG. 3 is an elevational view similar to FIG. 2 showing the bearing retaining apparatus fully installed on the universal joint for use when supplying lubricant therein.

To firmly install the bearing cup retaining apparatus 30, the hammer portion 38 is rapidly moved by the operator from the retracted position illustrated in FIG. 2 to the extended position illustrated in FIG. 3. When this is done, the hammer portion 38 strikes the first washer 36 and exerts a force urging the bearing cup retaining apparatus 30 axially toward the universal joint and yoke assembly 10. As a result, the end portions 32 of the bearing cup retaining apparatus 30 flex slightly apart from one another, allowing the inserts 33 to be moved further over the end surfaces of the bearing cups 13. In this manner, the bearing cup retaining apparatus 30 is firmly installed so as to positively retain the bearing cups 13 on the trunnions 11 of the universal joint cross during a subsequently lubricant purging process. When the lubricant purging process is completed, the bearing cup retaining apparatus 30 can be easily removed by rapidly moving the hammer portion 38 back from the extended position illustrated in FIG. 3 to the retracted position illustrated in FIG. 2 such that the hammer portion 38 strikes the second washer 37. The force exerted by the hammer portion 38 on the second washer 37 quickly releases the bearing cup retaining apparatus 30 from the bearing cups 13.

As mentioned above, the inserts 33 are preferably removably secured to the end portions 32 of the bearing cup retaining apparatus 30 by the threaded fasteners 34. This allows the inserts 33 to be shimmed or replaced because of wear caused by repeated use. However, the inserts 33 may be permanently secured to the end portions 32 if desired. Alternatively, the end portions 32 may directly engage the outer surfaces of the bearing cups 13 if desired.

As also mentioned above, the first and second washers 36 and 37 are preferably formed having an outer dimension that is slightly larger that the outer dimension of the shank portion 31. This is done to prevent accidental pinching of the fingers of the operator during use. To accomplish this, the axial width of the first washer 36 is preferably sufficiently large to accommodate the width of a finger without pinching when the hammer portion 38 is moved from the retracted position illustrated in FIG. 2 to the extended position illustrated in FIG. 3. Because the outer dimension of the hammer portion 38 is preferably much larger than the outer dimension of the second washer 37, the likelihood of finger pinching is minimized when the hammer portion 38 is moved from the extended position illustrated in FIG. 3 to the retracted position illustrated in FIG. 2.

Figure 4:
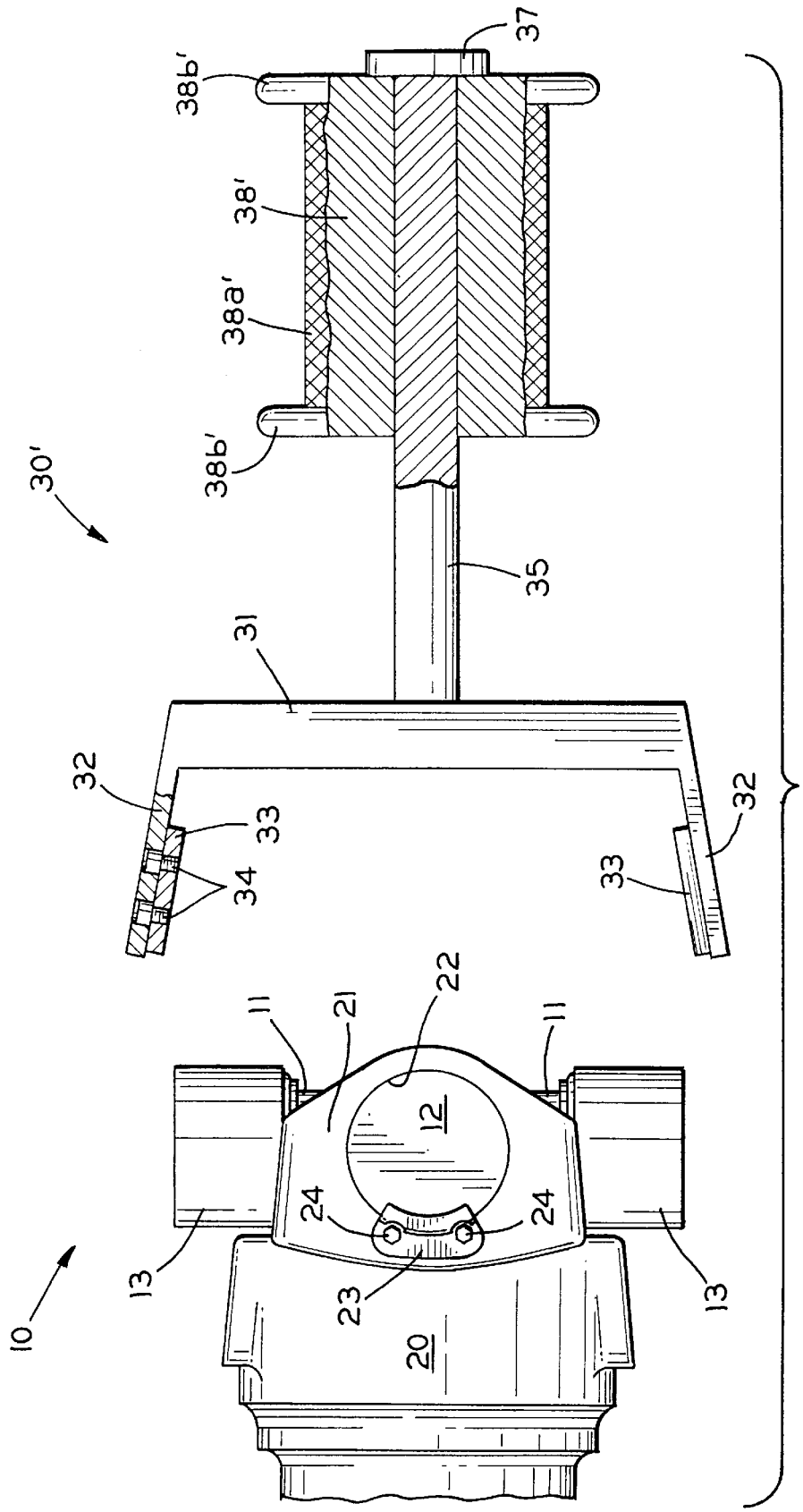
FIG. 4 is an exploded elevational view, partially in cross section, of a universal joint and a second embodiment of an apparatus for retaining the bearing cups on the trunnions of the universal joint cross when supplying lubricant therein in accordance with this invention.

Referring now to FIG. 4, there is illustrated a second embodiment of a bearing cup retaining apparatus, indicated generally at 30', in accordance with this invention. The second embodiment of the bearing cup retaining apparatus 30' is similar to the first embodiment of the bearing cup retaining apparatus 30 described above, and like reference numbers are used to indicate similar components. In the second embodiment of the bearing cup retaining apparatus 30', a modified hammer portion 38' is provided with a knurled outer surface 38a' and a pair of end flanges 38b'. The end flanges 38b' preferably extend circumferentially about the hammer portion 38' and are provided to positively prevent the fingers of the operator from slipping off of the knurled outer surface 38a' during use. As a result, the first washer 36 of the first embodiment of the bearing cup retaining apparatus 30 described above can be eliminated. The operation of the second embodiment of the bearing cup retaining apparatus 30' is otherwise identical to the first embodiment described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An apparatus for retaining bearing cups on respective trunnions of a universal joint cross when supplying lubricant therein comprising:

a body portion having a pair of end portions extending therefrom, said end portions being fixed in position and extending at an angle relative to one another, said end portions adapted to be respectively disposed over end surfaces of the bearing cups;

a shank portion extending from said body portion;

a hollow hammer portion disposed about said shank portion and movable relative thereto between a retracted position, wherein said hammer portion is spaced apart from said body portion, and an extended position, wherein said hammer is disposed adjacent to said body portion.

2. The apparatus defined in claim 1 further including an insert secured to each of said end portions.

3. The apparatus defined in claim 2 wherein said inserts are removably secured to each of said end portions.

4. The apparatus defined in claim 1 wherein said hammer portion is non-rotatable relative to said shank portion.

5. The apparatus defined in claim 1 further including a washer secured to an end of said shank portion adjacent to said body portion, said hammer portion abutting said washer when moved to said extended position.

6. The apparatus defined in claim 1 further including a washer secured to an end of said shank portion opposite from said body portion, said hammer portion abutting said washer when moved to said retracted position.

7. The apparatus defined in claim 1 further including a first washer secured to an end of said shank portion adjacent to said body portion and a second washer secured to an end of said shank portion opposite from said body portion, said hammer portion abutting said first washer when moved to said extended position and abutting said second washer when moved to said retracted position.

8. The apparatus defined in claim 1 wherein said hammer portion is formed having enlarged flanges.

9. The apparatus defined in claim 1 further including a first washer secured to an end of said shank portion adjacent to said body portion and a second washer secured to an end of said shank portion opposite from said body portion, said hammer portion abutting said first washer when moved to said extended position and abutting said second washer when moved to said retracted position.

10. A method for retaining bearing cups on respective trunnions of a universal joint cross when supplying lubricant therein comprising the steps of:

(a) providing an apparatus including a body portion having a pair of end portions extending therefrom, said end portions being fixed in position and extending at an angle relative to one another, said end portions adapted to be respectively disposed over end surfaces of the bearing cups, a shank portion extending from the body portion, and a hollow hammer portion disposed about the shank portion and movable relative thereto between a retracted position, wherein the hammer portion is spaced apart from the body portion, and an extended position, wherein the hammer is disposed adjacent to the body portion;

(b) positioning the apparatus such that the end portions abut respective end surfaces of the bearing cups; and (c) moving the hammer portion from the retracted position to the extended position such that a force is applied in a first direction to move the end portions further over the end surfaces of the bearing cups.

11. The method defined in claim 10 including the further step of moving the hammer portion from the extended position to the retracted position such that a force is applied in a second direction to remove the end portions from the end surfaces of the bearing cups.

12. A method for supplying lubricant to a universal joint cross comprising the steps of:

(a) providing a universal joint cross including a plurality of trunnions having bearing cups mounted thereon;

(b) providing an apparatus including a body portion having a pair of end portions extending therefrom, said end portions being fixed in position and extending at an angle relative to one another, said end portions adapted to be respectively disposed over end surfaces of the bearing cups, a shank portion extending from the body portion, and a hollow hammer portion disposed about the shank portion and movable relative thereto between a retracted position, wherein the hammer portion is spaced apart from the body portion, and an extended position, wherein the hammer is disposed adjacent to the body portion;

(c) positioning the apparatus such that the end portions abut respective end surfaces of the bearing cups;

(d) moving the hammer portion from the retracted position to the extended position such that a force is applied in a first direction to move the end portions further over the end surfaces of the bearing cups; and (e) supplying lubricant to the universal joint cross.

* * * * *

UNITED STATES PATENT AND TRADEMARK OFFICE
CERTIFICATE OF CORRECTION

PATENT NO. : 6,016,597
DATED : January 25, 2000
INVENTOR(S) : Ted D. Clemons

It is certified that error appears in the above-identified patent and that said Letters Patent is hereby corrected as shown below:

Column 6, Claim 1, Line 14,     after "hammer", insert -- portion --.

Signed and Sealed this

Fourth Day of July, 2000

Attest:

Q. TODD DICKINSON

Attesting Officer     Director of Patents and Trademarks